US008140306B2

(12) United States Patent
Kubli et al.

(10) Patent No.: US 8,140,306 B2
(45) Date of Patent: Mar. 20, 2012

(54) DETERMINATION OF PROCESS OPERATIONS IN ORDER TO DESCRIBE FORMING PROCESSES ON A FORMING PART

(75) Inventors: Waldemar Kubli, Neerach (CH); Matthias Hillmann, Zurich (CH)

(73) Assignee: Autoform Engineering GmbH, Neerach (CH)

( * ) Notice: Subject to any disclaimer, the term of this patent is extended or adjusted under 35 U.S.C. 154(b) by 876 days.

(21) Appl. No.: 11/568,230

(22) PCT Filed: Apr. 22, 2005

(86) PCT No.: PCT/CH2005/000227
§ 371 (c)(1),
(2), (4) Date: Nov. 10, 2006

(87) PCT Pub. No.: WO2005/103850
PCT Pub. Date: Nov. 3, 2005

(65) Prior Publication Data
US 2008/0243442 A1    Oct. 2, 2008

(30) Foreign Application Priority Data
Apr. 27, 2004    (CH) .................................... 731/04

(51) Int. Cl.
*G06G 7/48*    (2006.01)
(52) U.S. Cl. ............................................... 703/7
(58) Field of Classification Search ............ 703/7
See application file for complete search history.

(56) References Cited

U.S. PATENT DOCUMENTS 5,969,973 A * 10/1999 Bourne et al. .............. 700/165
7,031,893 B2 * 4/2006 Gupta et al. ..................... 703/6

FOREIGN PATENT DOCUMENTS
EP    0 955 105    11/1999
FR    2 711 326    4/1995

OTHER PUBLICATIONS

S.K. Gupta et al., "Automated Process Planning for Sheet Metal Bending Operations", 1998, Journal of Manufacturing Systems, vol. 15, No. 5, pp. 338-360.*

(Continued)

*Primary Examiner* — Paul Rodriquez
*Assistant Examiner* — Russ Guill
(74) *Attorney, Agent, or Firm* — Rankin, Hill & Clark LLP (57) ABSTRACT

Processing steps are determined and optimized during the production of sheet metal forming parts, for example, using deep drawing/stretch forming processes. During the determination, using a computer-assisted design system, of process operations (PO1-PO6) for the description of forming processes on a forming part, the following steps are carried out:
defining geometry models for the computerized description of a geometry of the forming part in a target state;
defining several geometry operators (m1-m9, e1-e6), wherein one geometry operator (m1-m9, e1-e6) associates a geometry of an area of a first geometry model with a geometry of an area of a second geometry model, and the geometry operator (m1-m9, e1-e6) describes a transition from one of the two associated geometries to the other one; and
defining several groups of respectively at least one geometry operator (m1-m9, e1-e6), wherein each one of the groups is respectively associated with a process operation (PO1-PO6).

17 Claims, 4 Drawing Sheets

OTHER PUBLICATIONS

Wei Tan et al., "Integration of process planning and scheduling—a review", 2000, Journal of Intelligent Manufacturing, vol. 11, pp. 51-63.*

H.B. Marri et al., "Computer-Aided Process Planning: A State of Art", 1998, International Journal of Advanced Manufacturing Technology, vol. 14, pp. 261-268.*

Cheng-Hua Wang et al., "Design and Manufacturing of sheet metal parts: using features to aid process planning and resolve manufacturability problems", 1997, Carnegie Mellon University, pp. 1-33.*

Cheng-Hua Wang, "Manufacturability-Driven Decomposition of Sheet Metal Products", 1997, Carnegie Mellon University, pp. 1-183.*

Joost R. Duflou et al., "Computer aided process planning for sheet metal bending: A state of the art", 2005, Computers in Industry, vol. 56, pp. 747-771.*

M. Tisza, "Expert systems for metal forming", 1995, Journal of Materials Processing Technology, vol. 53, pp. 423-432.*

Shigeru Aomura et al., "Optimized bending sequences of sheet metal bending by robot", 2000, Robotics and Computer Integrated Manufacturing, vol. 18, ten unnumbered pages.*

Aditya Soman et al., "Toward an automated approach to the design of sheet metal components", 2003, Artificial Intelligence for Engineering Design, Analysis and Manufacturing, vol. 17, pp. 187-204.*

Satyandra K. Gupta, "Sheet metal bending operation planning: using virtual node generation to improve search efficiency," 1999, Journal of Manufacturing Systems, vol. 18, No. 2, pp. 127-139.*

Cheng-Hua Wang, "Manufacturability-Driven Decomposition of Sheet Metal Products", 1997, Carnegie Mellon University, pp. 1-183.*

Faruk Cay et al., "An IT view on perspectives of computer aided process planning research," 1997, Computers in Industry, vol. 34, pp. 307-337.*

* cited by examiner

DETERMINATION OF PROCESS OPERATIONS IN ORDER TO DESCRIBE FORMING PROCESSES ON A FORMING PART

BACKGROUND OF THE INVENTION

1. Field of the Invention

The invention is related to the field of the determination and optimization of processing stages during the manufacturing of sheet metal forming parts, for example, by means of deep-drawing/stretch-forming processes. It is related to a method, a data processing system, a computer program and a data carrier for the determination of process operations for the description of forming processes on a forming part.

2. Description of Related Art

Sheet metal forming parts, as a rule, are manufactured by deep-drawing. The semi-finished parts, the so-called sheet metal billets (blanks), for this purpose are placed in multi-part forming tools. By means of presses, in which the forming tools are mounted, the parts are formed. The parts, as a rule, are manufactured out of a flat sheet metal billet in several forming stages by means of processing stages such as drawing, restriking, adjusting, etc., in combination with cutting stages.

The dimensioning and adjusting of the forming tools represents a big problem today. Not infrequently several months pass, until a tool works satisfactorily. Frequently it is an iterative process, which is associated with a lot of rejected parts and consumption of energy and resources. The planning today to a great extent takes place manually and exceedingly time-consumingly by means of Computer-Aided-Design systems (CAD). CAD systems of this kind model a geometry of physical bodies, thus in particular of forming parts in different stages of the processing, and of corresponding tools. Understood by "geometry" here is a (computer readable) representation of the geometrical dimensions of a body, for example, in the form of a finite elements grid, or from a quantity of parameterized elemental bodies and/or surfaces.

In this manner, a process layout (method plan) is developed, which among others describes a sequence of part geometries to be produced. In doing so, the model of every state is essentially produced manually out of basic modules or out of another model through the modification of it. The process layout (method plan) as a rule also describes an allocation of individual forming operations to the part geometries. From this, manually, and only to a limited part computer-assisted, are parameters of the forming operations defined and the forming presses, respectively, tools designed.

A process layout (method plan) today as a rule consists of a set of 2D drawings. Starting out from the finished component, first the drawing stage is determined. Starting out from this drawing stage, thereupon the following operations are defined, wherein the restriking, folding, cutting and slider operations are only defined by the indication of the area and the working direction. As a rule, no 3D surfaces are built-up for the tools.

The procedure described is very elaborate and inflexible.

BRIEF SUMMARY OF THE INVENTION

It is therefore the objective of the invention to create a method, a data processing system, a computer program and a data carrier for the determination of process operations on a forming part of the type mentioned at the beginning, which remedies the disadvantages mentioned above.

This objective is achieved by a method, a data processing system, a computer program and a data carrier for the determination of process operations for the description of forming processes on a forming part with the characteristics of the corresponding independent claims.

The process for the determination, by means of a computer-assisted design system, of process operations for the description of forming processes on a forming part comprises the following steps:

defining geometry models for the computer-oriented description of the forming part in its final state;

defining several geometry operators, wherein a geometry operator associates a geometry of an area of a first geometry model with a geometry of an area of a second geometry model, and the geometry operator describes a transition from one of the two associated geometries to the other one; and defining several groups of respectively at least one geometry operator, wherein each one of the groups is respectively associated with a process operation.

With this a structured processing and representation of the processing stages, respectively, a sequence of process operations by means of the allocation to the geometrical modifications in a part geometry model is achieved. In this manner, the differing ways of looking at things in the geometry-based drafting world and in the process-based world of the designing of forming tools are brought to a practically utilizable association.

This type of grouping, respectively, structuring of the geometry operators makes a representation and processing of the originally solely geometrically formulated information close to the production possible. The linking together, respectively, the association of geometry areas of different stages and to process operations enables an automatic and consistent propagation of changes of the geometry of a certain stage to the other stages and to parameters of the process operations.

Through the operator certain areas of two geometry models are associatively allocated to one another and with this are associatively linked with one another. The operator describes a change of geometry, as a rule by the utilization of a tool. In doing so, parameters of the operator are defined, respectively, calculable on the basis of predefined geometries, or vice versa a geometry is capable of being calculated from the other one on the basis of predefined parameters of the operator.

In this context, the expression "defining" signifies the establishment of a computer-oriented, i.e., computer readable representation, which is capable of being processed by a computer, respectively, a technical data processing unit. The defining, as a rule, takes place through computer-assisted user entries and through computations, which combine the user entries with already calculated and/or stored data. Data defined in this manner are capable of being produced in a CAD system and/or stored intermediately in a file.

The expression "area" of a geometry model is to be understood in such a manner, that it is also capable of encompassing the complete geometry model. An area of this kind of a forming part as a rule comprises one or more geometrical characteristics or form characteristics, therefore, for example, bulges, flanges, roundings, holes, etc. Characteristics of this kind are represented by a purely geometrical model, for example, by a finite elements grid or by a number of parameterized elemental bodies and/or surfaces.

For the definition of geometry models and geometry operators two alternative procedures are possible. In the case of both of them, one starts out from an area of a first geometry model of a further processed part and determines an area of a second geometry model of a part processed to a lesser extent.

In a first variant of the invention, in doing so the second geometry model is predefined, for example, by a user-controlled modification of a copy of the first geometry model. From these two geometry models it is possible to automatically derive a description of the operator, for example, in the form of tools, corresponding to a forming process stage in reverse direction.

In a second variant of the invention, the first geometry model and an as far as necessary parameterized version of the geometry operator are predefined, and the second geometry model is automatically calculated from these. It is, for example, possible that an operator for the enlargement of radii from an edge with a small bending radius in an area of the first geometry model calculates an edge extending in the same direction with a larger bending radius. In the forming process taking place in reverse, this geometry operator corresponds to a restriking or sharpening of edges.

Therefore, at least one of the geometry operators is applied to one of the associated geometries of an area and from it the second one of the associated geometries of an area is calculated. With this, it is thus possible to determine a geometry model automatically, in that the geometry operators, which associate the individual areas or characteristics of this geometry model with preceding geometry models, are applied to the latter.

Which variant is appropriate depends on the type of geometry operator. Possible types of geometry operators will be presented further below.

In this procedure, also, a successive application of several geometry operators to associated areas is included. In doing so, a geometry model or a part of it is produced by the application of a geometry operator and itself is once again the starting geometry for the application of a second geometry operator. This—in the opposite direction—corresponds to a successive application of different partial forming stages.

In a further preferred variant of the invention, several geometry models of areas are grouped as definition of a geometry stage, wherein a geometry stage signifies a fictitious or also a real geometry of the forming part as a whole. "Fictitious" signifies that it is possible that the geometry is produced in a real manner in a quite defined sequence of forming operations, but that this must not imperatively be the case.

With this it is possible to calculate a geometry of a geometry stage from a geometry of at least one preceding geometry stage by the application of the corresponding operators. "Preceding" with respect to the geometry stages signifies a geometry stage produced earlier in the design of the geometry stages. Therefore the geometry stage, which corresponds to the finally formed forming part, precedes all other geometry stages.

In contrast to this, the manner of looking at things within the framework of the forming processes is the opposite: Here the unprocessed, flat sheet metal billet is the one which precedes all other forming stages.

In a refined manner of looking at things it is possible that a first geometry stage, from which one departs, and which corresponds to the finally formed forming part or defines it, respectively, is considered as the target geometry stage. Further geometry stages are then considered as intermediate geometry stages. This manner of looking at things is usually designated as a process layout (method plan). The process layout (method plan) states how intermediate geometry stages or intermediate geometries are to be formed during the production, and in part also, in which forming step which partial area of the forming part is formed in which manner.

The intermediate stages of the process layout (method plan) for the designer represent a mental ordering aid in the combination and definition of the different geometry operators. It is therefore possible, as mentioned above, that they are "fictitious" intermediate stages. The actual combination and sequence during the application of the geometry operators typically deviate from it. For example, it is possible that a cutting operation with a long or even with a circumferential cutting edge is split-up into several forming process operations.

In a further preferred embodiment of the invention, in case of a change of a geometry of an area an automatic and recursive recalculation of dependently associated geometries of areas is carried out in accordance with the associating operator. "Dependently associated" is understood in the sense, that a second geometry, which is calculated by the application of a geometry operator from a first geometry, is dependently associated with the first geometry.

As a result, it becomes possible to carry out changes in a geometry, in particular in the target geometry stage, and to propagate these into the following geometry stages recursively. Without any further manual work, therefore all other geometry models, thus the complete process layout (method plan), are automatically adapted.

In a further preferred embodiment of the invention, the geometry operators comprise at least one of the following operator types. Described in conjunction with the operator types are the respectively preferred implementation variants.

Filling holes: Holes present in the starting part are automatically filled with the help of special algorithms. For the production process proceeding in reverse this signifies, that a cutting operation takes place.

Adding a drawing geometry: For a drawing geometry, in preference a design parameterized through profiles and a sheet metal holding surface are added to the part. By this, for a further succeeding operation, for example, "Uncoiling drawing stage", automatically a drawing stage with die, sheet metal holder and bottom die is defined. In addition, a cutting line along the edge of the part, if so required including any flanges, is defined on the geometry stage.

Adding folding flanges: first of all the flanges to be formed in the respective geometry stage are selected. From this, parametrically defined folding jaws are automatically added to the part (without flanges). This corresponds to the state with closed tools. From this, as described above, for a further following operator the holder and folding jaw are produced. The cutting line results from laying the flange out on the folding jaw.

Unfolding: In a geometry stage, it is possible to select areas and to rotate them around an axis. The remaining areas either remain unchanged or else form a transition area, which is automatically formed, in order to produce a connection between the moving and the fixed areas. Through this unfolding operation, it is possible to, e.g., open parts and set up flanges.

Pre-forming (developing a pre-bubble): This includes different methods of locally simplifying a part, in order to make the production process possible. It is possible that this concerns, e.g., the enlarging of radii, also however, the replacement of complicated geometry parts by more simple ones.

Cambering (embossing) or over-pressing: A geometry is cambered in order to compensate for spring-back or resilience. A special functionality is available, which makes it possible to select areas of the geometry and to predefine displacements at any location. Out of these displacements a smooth function is determined, which in particular at the edge of the cambered area is zero, and additively superimposed on the existing geometry.

It is possible to group these operator types as

Geometry expansions: Filling holes and adding designing of drawing geometry (sheet metal holder and addendum).

Geometry modifications: Unfolding of geometry areas, pre-forming geometry areas, adding flange geometry and cambering surfaces.

In a further preferred embodiment of the invention, an application of at least one operator contains a simulation of the forming process. For example, from a cutting line defined in a second geometry stage by physical simulation it is determined, where the cutting line will be located in a first geometry stage following one or several forming stages, and the defined cutting line in the second geometry stage is iteratively corrected if so required. As the result of the iteration process, the course of the cutting line in the second geometry stage results in function of the course of the first geometry stage. It is possible to express the complete iteration process as part of an application of the geometry operator to the corresponding area of the first geometry stage.

In a further preferred embodiment of the invention, a structuring of a description of forming processes on a computer readable medium and/or for a user interface corresponding to the group of respectively several geometry operators takes place. With this, the grouping in accordance with the invention becomes easily accessible for a user or for a program thanks to the simple representation due to the structuring.

In a further preferred embodiment of the invention, an automatic production of tool—and processing parameters for the implementation of at least one of the geometry operators is carried out. For the geometry operators, therefore as a rule, respectively associated and dependently linked tool parameters and processing parameters exist. With this, an automation to a great extent of the tool draft design is capable of being implemented. This takes place by the reduction of all processing steps to such elementary geometry operators, for which an automatic tool design is possible at all.

A set of tools for an individual forming operation, or if so required, for a complete process operation, as a rule, consists of three tools: A bottom die or a number of jaws, a holder and a die or a support. In addition, it is possible that internal holders and/or sliders are present. The main task during the definition of the tools lies in the determination of their geometry as well as in the working direction of the moving tools. Further parameters such as working forces and working speeds can be derived from these by utilizing standard values and/or materials characteristics. In case of the automatic determination of the tool geometry, mainly the target geometry, i.e., the geometry of the resulting formed area is decisive. In addition or alternatively, for this also parameters of the starting geometry or of another, as a rule preceding geometry stage are utilized.

Preferably, also in case of a changing of the geometry of an area an automatic recalculation of dependently associated tool parameters and processing parameters is carried out.

In a preferred embodiment of the invention, on the basis of the calculated tool parameters and of the grouping of the forming process steps, a simulation of individual forming process steps, of a process operation or of a complete sequence of process operations is carried out. With this, the changes in the draft design of the geometries are automatically propagated to the tools and further to the formed sheet metal part and effects on the production process are visible without any further significant user intervention. Inadmissible loads and states are capable of being identified on the basis of the simulation, and it is possible to correspondingly correct the geometries.

By the expression "simulation" in this connection a simulation of a forming—or processing process is meant, which takes into consideration the physical characteristics of an object. Also taken into consideration are characteristics of the process, such as, for example, friction, lubrication, processing speed. In the simulation, for example, finite element methods, finite differences, "boundary element methods" or so-called "meshless methods" are utilized.

In contrast to a CAD system, which models static states, the simulation models a dynamic process or a transition between states taking into consideration and or calculating physical characteristics, such as tensions, stretching or elongations, cutting forces, hardening, etc. CAD systems and simulation systems in forming technology up until know have been implemented as separate program systems. If at all, an interaction up to now solely takes place through a data exchange of geometry data.

The data processing system for the determination of process operations for the description of forming processes on a forming part comprises storage means with the computer program means stored in them, which describe a computer program, a data processing means for the execution of the computer program, wherein the execution of the computer program leads to the execution of the method in accordance with the invention.

The computer program for determining process operations for the description of forming processes on a forming part in accordance with the invention is capable of being loaded into an internal memory of a digital data processing unit and comprises computer program code means, which, when they are executed in a digital data processing unit, bring these to execute the method in accordance with the invention. In a preferred embodiment of the invention, a computer program product comprises a data carrier, respectively, a computer readable medium, in which the computer program means are stored.

BRIEF DESCRIPTION OF THE DRAWINGS

In the following, the object of the invention is explained in more detail on the basis of preferred examples of embodiments, which are illustrated in the attached drawings. Illustrated respectively are cross sections through in general three-dimensionally bent geometry stages. The main working direction respectively is the vertical direction. The drawings respectively schematically illustrate FIGS. 1 and 2 a sequence of geometry stages for the description of intermediate steps during the production of a forming part;

FIG. 4 top: Different sheet metal part forms in conjunction with flanges and adding designs;

middle: Tool shapes for the production of folding flanges;

bottom: Tool shapes for the production of adjusting flanges.

The reference marks utilized in the drawings and their significance are listed in summary in the list of reference marks. On principle in the figures the same parts are marked with the same reference marks.

DETAILED DESCRIPTION OF THE INVENTION

Figure 1:
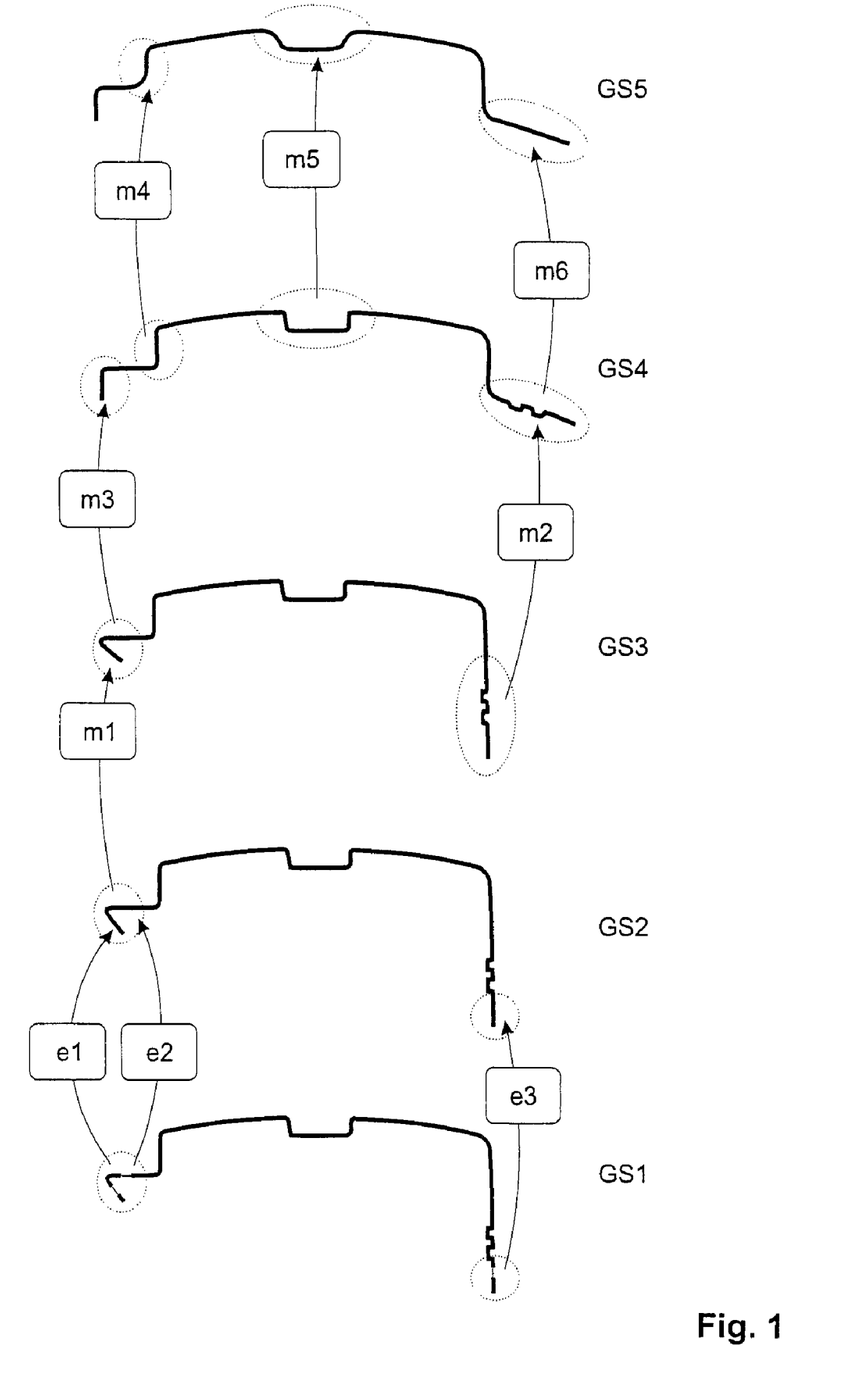
Figure 2:
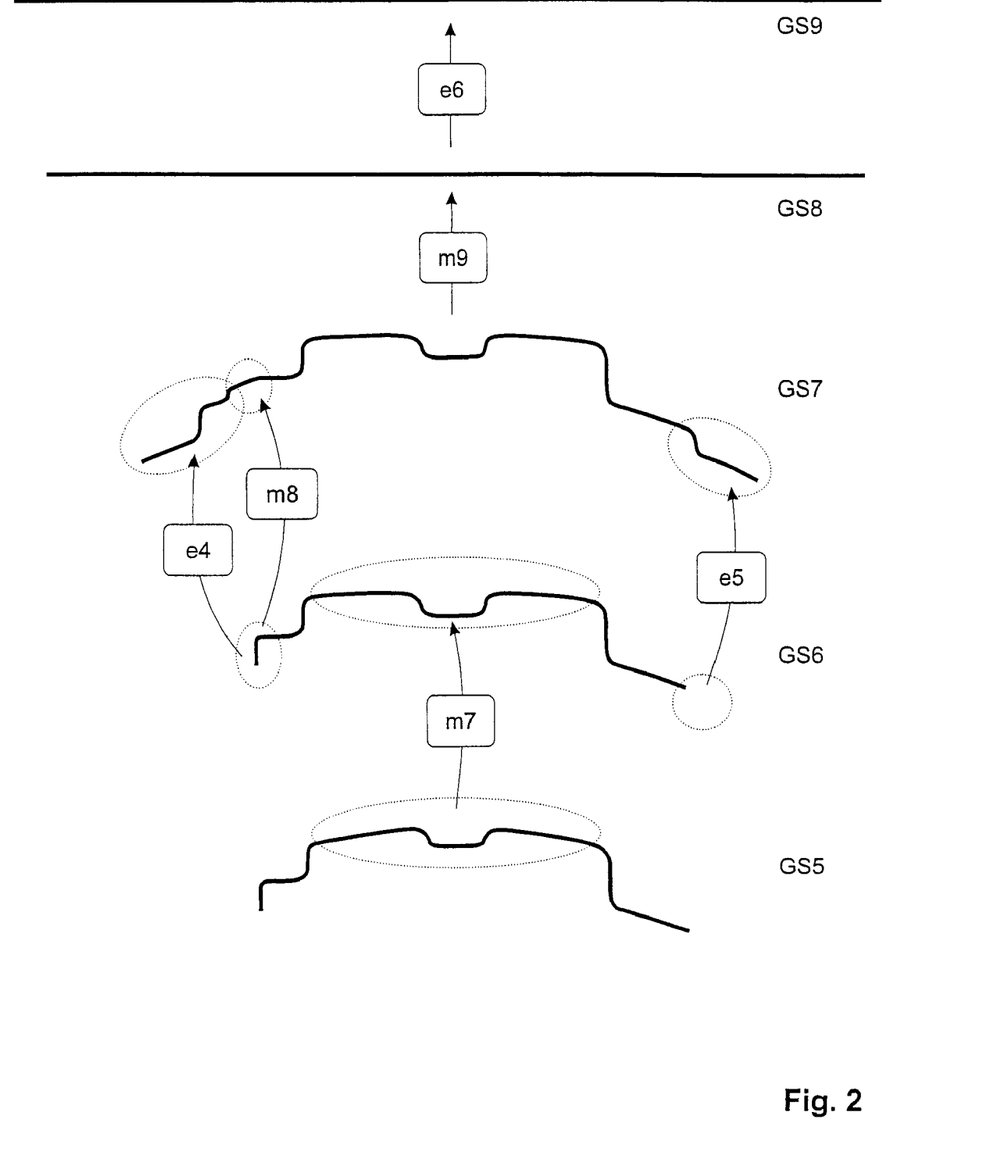

FIGS. 1 and 2 illustrate a sequence of geometry stages for the description of intermediate steps during the production of a forming part. The sequence commences with a target geometry stage GS1 right at the bottom in FIG. 1 and continues up to a geometry stage GS9 corresponding to a billet arranged in flat state on the coil, respectively, on a continuous sheet metal tape, right at the top in FIG. 2. An intermediate geometry stage GS5 right at the top in FIG. 1 is illustrated repeated again right at the bottom in FIG. 2.

When drafting designing the geometries, one departs from the finished part GS1 and simplifies it stage by stage, for example, up to the flat sheet metal billet on the coil GS9. For the purpose of clarity, several simplification stages are respectively illustrated combined by a geometry stage GS1-GS9. The difference between one geometry stage to another, in a certain geometrical area of it, defines the tools required, such as drawing tools, post-forming tools, jaws, sliders, etc., as well as the required process, such as forming or cutting. These areas, respectively their geometry models are associatively linked by operators, wherein a stage depends on the stage following it in the forming process. It is possible to automatically calculate the forms of the tools for the forming operations and/or the operators as 3D-models on the basis of the data of the geometry stages and these are, e.g., capable of being utilized for the simulation of the production process.

When an operator is applied to a geometry area, which is produced or modified by another operator, then these two operators are linked with one another. By the application of linked operators, therefore a geometry area of a stage is reproduced over several stages to a following stage.

The operators are illustrated grouped as operators for the geometry modification m1-m9 or as operators for the geometry expansion e1-e6. The application of an operator to a certain area of the geometry corresponds to a changing of the geometry from one stage to the other. In areas, to which no operator is defined, the geometry remains unchanged. It is possible to group the most important geometry operators in accordance with the types     filling holes,
    adding drawing geometry/bending flanges,
    adding folding flanges,
    over-pressing,
    unfolding or folding out,
    pre-forming/generating patterns,
    cambering,
    unwinding drawing geometry,
    arranging billet on coil, and
    rotating.

Depending on the type of the operator, it is possible to automatically determine corresponding tool geometries and further parameters in different manners.

The different operators are described in the following, and are subsequently illustrated as examples applied in the FIGS. 1 and 2. In doing so, the terms "target geometry" and "starting geometry" are utilized as follows: The target geometry is an area of a first geometry stage, the starting geometry is an area of a second dependent geometry stage; the geometry operator conducts the target geometry into the starting geometry. When in the following the discussion is about geometry operators and geometry stages, then the starting geometry is designated as a "next stage" after the target geometry. To every geometry operator there is a corresponding forming process step, which in the forming process produces the target geometry out of the starting geometry. The forming process stage belonging to the geometry operator in the title is respectively placed in parentheses. When the discussion is about forming processes, then respectively a "next" forming stage is produced (corresponding to a target geometry) by forming a preceding forming stage (corresponding to a starting geometry).

The operators are defined by at least one of the geometries involved, as well as the second geometry and/or by predefinable parameters. Frequently, the target geometry and the starting geometry are predefined and further parameters are calculated from them, in particular tool parameters of the allocated forming process step. In many cases the target geometry and one operator parameter are predefined and from them the starting geometry first is automatically calculated.

Filling Hole (Punching, Resp., Cutting):

If from one geometry stage to the next geometry stage holes are filled or edges completed, then for the forming process this signifies that a cutting operation is defined. The cutting contours are determined by the edge lines of the holes.

The cutting contours respectively are successively transferred to all dependent geometry stages. This makes it possible to cut the holes in any subsequent geometry stage (therefore in one preceding in the process sequence), therefore not only in that geometry stage, in which the holes are filled. The transfer takes place     in the case of the parameterized geometry operator, by the
        application of the geometry operator also to the cutting
        contours,
    and in the case of the definition of the geometry operator,
        by the geometry stages, e.g., by the projection of the
        cutting contour from the target geometry to the starting
        geometry.

Alternatively it is possible that the cutting contour, taking into account materials—and process characteristics, is transferred from one geometry stage to the next one by a physical simulation, e.g., by an inverse one-step simulation.

The operator parameters and with this the tool parameters are determined by the geometry stage, on which the cutting operation is carried out: The working direction for the cutting operation is determined by an integrated cutting analysis, which analyses the maximum permissible angles between the cutting tool and the forming part and based on this proposes an optimum cutting direction.

The transferring of the cutting contours to the dependent geometry stages as well as the determination of the cutting direction of the cutting operation is carried out in analogy also for the edge cuttings and is not particularly mentioned anymore for the following operators, which define edge cuttings of this type.

Figure 4:
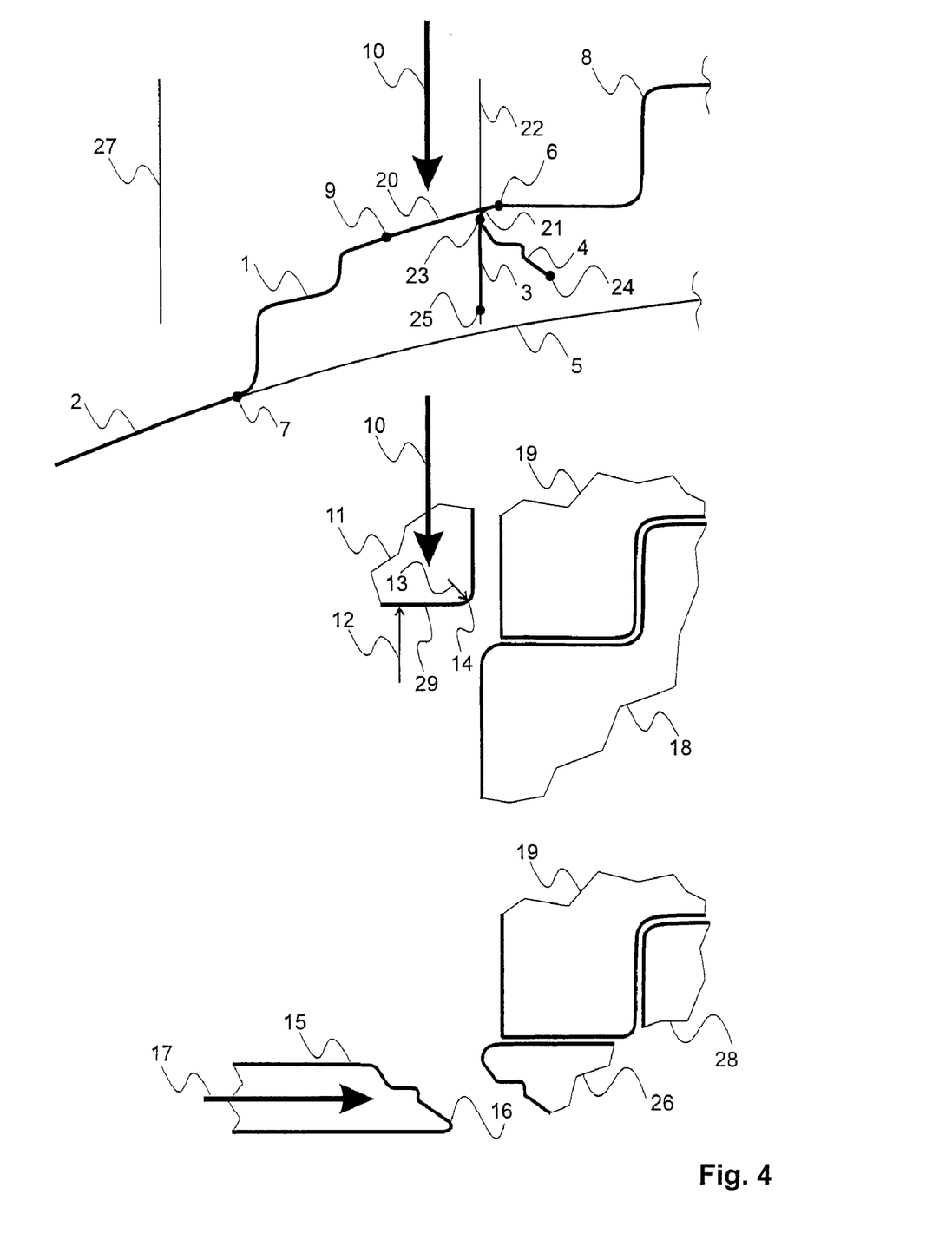

Adding Drawing Geometry/Uncoiling Bending Flanges (Cutting/Folding or Adjusting):

The following steps of the preferred automated procedure are described on the basis of FIG. 4. From one geometry stage to the next one a drawing geometry, i.e., an addendum 1 (which also includes an area 20 corresponding to a bent flange) and sheet metal holder ring 2 are added. In doing so, any flanges 3 or 4 including the complete bending radius 21 or parts of it are removed from the geometry model along an edge 6 manually and/or computer-assisted. In the case of the manual removal, the edge 6 is predefined by a user, in case of the computer-assisted removal, for example, an area of the sheet metal geometry is selected by a user, and in it automatically the edge 6 is determined as a projection of bent areas, the bending radius of which falls below a predefined value. The geometry model is manually, if so required with computer assistance, expanded by addendum 1 and sheet metal holder ring 2 and the removed flanges 3 or 4 are uncoiled onto the added geometries 1 and 2. If the flange 3 or 4 is a, as described further below, previously automatically produced folding flange 3, then its expanse is already known and it is possible to also remove it automatically. If not, it is deleted by the user. For the addendum 1, first a sheet metal holder surface 5 is generated, in that the user, e.g., predefines profiles and through the profiles a surface is interpolated. Thereupon parameterized profiles are added to the geometry stage along the edge 6 after the removal of the flanges 3 or 4, which connect the edge 6 with the sheet metal holder surface 5 and with this define the die passage line 7, along which the sheet metal holder surface 5 is cut out to the sheet metal holder ring 2. The profiles are predefined by the user at individual points of the edge 6, at the other points interpreted from the given profiles, and with this they form the addendum 1 between the original geometry stage 8 (without flanges) and the sheet metal holder ring 2. The development of the flanges 3 or 4 takes place, e.g., through geometrical algorithms, e.g., the measuring and taking away of cutting lengths in cuts standing vertically to the edge 6, or taking into account materials—and process characteristics through an inverse one-step simulation.

The operator parameters are the flange areas 3 or 4 on the target geometry to be removed as well as the addendum areas described by parameterized profiles and a sheet metal holder surface 5 of the starting geometry. The operator in the forming process corresponds to a cutting step, resp., at points with flanges to a cutting along the developed flange edge 9 with a subsequent bending or adjusting of the flange. From the flange geometry is determined in the case of a folding flange 3—this is present in the case of a generally cylindrical shape of the flange surfaces—automatically the infinitely expanding general cylinder surface containing the flange surfaces, in preference by the nestling of straight lines, as is described in more detail further below. Thereupon the guiding direction of this cylinder surface is determined as the working direction 10 for the bending step and indicated to the user. The user has the possibility of accepting the working direction or of changing it, in order to, for example, implement a bridging for the compensation of the spring-back or resilience. Thereupon from the general cylinder surface the folding jaws 11 are produced, wherein it is possible to predefine the attack of the jaws through the course of the jaw height 12 and the jaw radius along the jaw 11. The courses of the jaw height and the jaw radius along the jaw edge 14 are capable of being interpolated on the basis of several predefined cross sections or by parameterized functions. The values of the jaw height 12 are able to be predefined either as absolute values or relatively, e.g., as distances measured in the bending direction from the addendum surface 1. The distance of the jaw 11 from the addendum surface 1 measured in the bending direction defines the attack of the jaw and is visually represented, e.g., as a color distribution on the jaw 11 or on the addendum 1. The jaw bottom 29 is automatically added to the jaw edge 14 tangent-continuous as a smooth surface. From the jaw geometry the tool paths are automatically derived. From the target geometry and from the general cylinder surface automatically the tools necessary for the supporting of the forming part are produced. As a rule, these are the support 18 and the holder 19;

in the case of an adjusting flange 4—this is applicable with a not generally cylindrical, more complicated and a frequently with respect to the main working direction undercut shape of the flange surfaces—or when the user requires this, automatically an adjusting slider 15 or form slider and its tool are derived, wherein the slider attack is capable of being predefined through the course of the rounding surfaces 16 along the edge of the active surface of the slider. As an aid, the distance of the slider from the addendum surface 1 measured in the working direction of the slider is visually depicted, e.g., as a color distribution on the slider 15 or on the addendum. A slider working direction 17, in which the slider 15 is capable of shaping the adjusting flange free of any undercut, is automatically proposed, wherein for this it is possible that also several adjusting flanges are simultaneously evaluated. The direction 17 is able to be adapted by the user. As an aid, the area of all possible inclinations of the direction 17, which do not lead to undercuts, is depicted in an x-y diagram. If the predefined direction produces undercuts during the slider operation, these areas are visually represented, e.g., as a color distribution on the flange 4. In the case of a not undercutting geometry of the adjusting flange 4, in an analogue manner instead of a slider tool 15 a post-forming tool acting in the main working direction is generated. From the target geometry automatically the tools necessary for the supporting of the forming part are produced. As a rule, these are the support 28, the holder 19 and a filling slider 26.

This operator is combined, this means both a modifying, i.e., the flange is modified to become an uncoiled flange, as well as an expanding operator, this signifies that an addendum 1 and 2 is added outside the uncoiled flange 20.

Adding Folding Flanges (Adjusting):

From one geometry stage to the other a folding flange 3 is produced, which is to be formed as an intermediate stage for the production of a—frequently undercut with respect to the main working direction—adjusting flange 4. For this purpose, the adjusting flange 4 is manually removed, if so required computer-assisted (see above) and replaced by a generally cylindrical folding flange 3. From the geometry of the adjusting flange 4, the working direction 10 of the general cylinder, corresponding to the working direction for the folding for the production of the folding flange, is determined and indicated to the user. This direction is determined in such a manner, e.g., that the folding flange 3 resulting from it comes to lie as close as possible to the adjusting flange 4, does nowhere, however, penetrate it, wherein for this purpose it is also possible to simultaneously take into account several folding flanges to be produced. The user has the possibility of accepting the direction or of predefining a direction himself. As an aid, the area of all possible inclinations of the direction, which do not lead to penetrations, is depicted in an x-y-diagram. In case of a manually predefined direction, the penetration points of folding flange 3 and adjusting flange 4 are automatically established and visually depicted on the adjusting flange 4, e.g., as a color distribution. Thereupon, straight lines 27 running in this direction are automatically nestled against the bending radius 21 of the adjusting flange from the outside. The geometrical locus of all such straight lines forms a general cylinder surface 22. This is now cut off at the contact points 23 of the straight line with the bending radius 21. In addition, the edging line 24 of the adjusting flange is uncoiled onto the cylinder surface 22, which results in an uncoiled edging line 25. This takes place either geometrically, e.g., through cuts standing vertically to the bending edge over equal cutting lengths, or by taking into account materials and process characteristics with an inverse one-step simulation. The cylinder surface 22 is also cut off at this uncoiled line 25 and now forms the folding flange 3.

The operator parameters are the surfaces of the adjusting flange 4 and the cylinder direction 10. The operator in the forming process corresponds to an adjusting step. The tools are automatically generated out of the target geometry: The adjusting slider 15 or forming slider, its working direction 17 and its tool path are derived from the geometry of the adjusting flange 4 as described above, wherein the slider attack is able to be predefined through the course of the rounding surfaces 16 along the edge of the active surface of the slider. As an aid, the distance of the slider from the adjusting flange in the working direction of the slider is established and visually depicted, e.g., as a color distribution on the slider or on the cylinder surface. Also produced automatically from the target geometry are the tools necessary for the supporting of the forming part, as a rule a support 28, a holder 19 and a filling slider 26.

In summary, the method described for the automatic adding of folding flanges 3 and for the determination of processing steps associated with it therefore comprises several of the following steps:

Determination of a geometry area of a target geometry stage with an adjusting flange 4.

Either manual or computer-assisted determination of an edge (corresponding to the bending radius 21) along the adjusting flange 4 and a transition line 23 between the bending radius 21 and the adjusting flange 4.

or determination of a working direction 10 and nestling of straight lines running in the working direction 10 against the adjusting flange area for the determination of a contact line 23 corresponding to the contact points 23 of the nestled straight lines with the edge.

or manual or computer-assisted determination of an edge 6, tangent-continuous adding of a rounding surface corresponding to the bending radius 21, but with a changed course of radii, and nestling of straight lines running in the working direction 10 against the rounding surface for the determination of a contact line 23 corresponding to the contact points 23 of the nestled straight lines with the rounding surface. In this case a simultaneous pre-forming of the bending radius takes place.

Removing of parts of the geometry model, which are located outside the transition line 23, respectively, the contact line 23.

Adding, starting out from this contact line 23 and running in the working direction, of a cylinder surface 22 (corresponding to the straight lines nestled against the geometry model).

Uncoiling of the flange area 4 of the target stage onto this cylinder surface 22 for the determination of an edging line 25 on the cylinder surface of the uncoiled flange area. The uncoiling is able to take place purely geometrically or with the inclusion of a physical simulation of the corresponding forming operation. The geometry model with the added cylinder surface 22 limited by the edging line 25 corresponds to a folding stage with the folding flange 3.

Determining tool geometries of bending tools on the basis of the geometry of the starting geometry stage and/or of the geometry of the folded stage and of the working direction, in preference on the basis of the cylinder surface 22 not yet limited towards the bottom, respectively towards the outside.

Determining a geometry of an adjusting slider 17 and of a corresponding filling slider 26 or of a re-forming tool corresponding to a geometry of the adjusting flange 4 and if so applicable to the folded stage.

If during the re-forming solely a folding flange is to be produced, the corresponding folding tools are produced in accordance with the cylinder surface 22, and the determination of the adjusting tools is dropped.

This procedure for the production of folding flanges is extremely simple and rapid for the user to carry out. It suffices to roughly define the adjusting flange and to predefine the working direction 10. The precise area of the adjusting flange to be replaced, this signifies the manually, with conventional CAD methodology extremely time-consuming to determine transition line 23 to the folding flange, is determined completely automatically. In case of an adaptation of the folding direction, this area is completely automatically adapted. The same is applicable for the determination of the edge 25 of the folding flange, which is carried out completely automatically. In comparison with the conventional CAD—procedure, the aids made available for the determination of the optimum folding direction and of the optimum course of attack of the folding jaws and of the adjusting sliders and the parameterization enable a significantly more rapid establishment of better protected folding and adjusting tools.

Over-Pressing (Spring-Back, Resilience):

If the angles of flanges have to be over-pressed for the compensation of a spring-back or resilience, then the over-pressed shape is defined as an intermediate geometry. For this purpose, the flange is selected in the target geometry, rigidly rotated around a predefined folding edge and the transition area between the rigidly rotated area and the fixed area is adapted tangent-continuously.

The operator parameters essentially are the flange geometry, the folding edge and the over-pressing angle. The operator in the forming process corresponds to a fictitious forming stage, namely to a spring-back, which during the removal from the forming tools takes place on its own. Therefore no tools have to be derived.

Unfolding (Raising):

In order to keep the drawing depth as small as possible, it is possible to unfold (fold-out) areas of the forming part from one geometry stage to the next, wherein areas already formed in detail are jointly swung-out without any change. The unfolding edge in doing so is in most cases straight and is located in a flat area. The geometry operator is defined and implemented in the same manner as for the over-pressing. Because the unfolding angles are significantly greater than in the case of over-pressing, particular attention has to be paid to the transition area between the rotated and the fixed geometry area: Strived for here is a tangent-continuously fitted in rounding surface. In case of a straight unfolding edge this is easy to produce. The rigidly rotated area is, in addition, positioned in such a manner, that in the area of the unfolding edge the surface area contents before and after the unfolding are of the same magnitude, that therefore through the unfolding no stretching or compression takes place.

The operator in the forming process corresponds to a raising step. The tools necessary for the supporting of the forming part, as a rule a support and a holder, are produced out of the target geometry. The raising is effected by a folding jaw, which is automatically produced in analogy as described above under "Adding target geometry", wherein the surface decisive for the production, corresponding to the folding flange is the surface area, which in the target geometry is located immediately at the unfolding edge on the area to be folded out, is flat and with this the for the folding jaws necessary condition of the general cylinder is fulfilled. The tool path of the folding jaw is automatically selected in such a manner, that the folding jaw brushes over the folding-out area sufficiently far to stand it up completely, only sufficiently far, however, that possibly already pre-formed details in the folding-out area are not affected.

Pre-Forming/Generating Patterns (Restriking):

For reasons of formability, it is necessary to pre-form geometry areas with tight radii, resp., to generate patterns. This takes place either directly through a manual design pre-definition of the pre-formed geometry as starting geometry or else through automatic smoothing of the target geometry. With this, the operator parameters are defined by the associatively linked geometries.

A special kind of pre-forming is the enlargement of radii, wherein for a small bending radius a starting geometry with a larger bending radius is produced at the same point of the sheet metal part. In this, the starting geometry is determined by the predefinition of a bending radius at a certain point of the target geometry. In this case it is possible to utilize the bending radius as a predefinable operator parameter, from which automatically the starting geometry is calculated, out of which once again the remaining operator parameters, therefore the tool parameters, are determined.

The operator in the forming process corresponds to a restriking step. The required tools, as a rule a support, holder and restriking jaw, and the other process parameters are automatically derived from the target geometry.

Cambering (Springing-Back):

If geometry areas for the compensation of a springing-back have to be cambered, then the cambered form is defined as an intermediate geometry. For this purpose, the user first defines the area to be cambered and then in this area at individual points predefines the required cambering height. From this a smooth height function is interpolated, which extends across the area to be cambered and which becomes zero at its edges. This height function is then additively superimposed on the target geometry. Geometry characteristics present in the target geometry are only slightly deformed by this and in principle remain maintained.

The operator parameters are the cambering area and the height predefinitions in places. The operator in the forming process corresponds to a fictitious forming step, namely a spring-back, which during the removal from the forming tools takes place on its own. Therefore no tools have to be derived.

Uncoiling the Target Geometry (Drawing):

The first drawing step is uncoiled onto the flat billet, respectively, onto the starting geometry as target geometry. For this purpose, the pulled-in edging of the sheet metal part required after the drawing is predefined, e.g., as a constant offset from the die passage line, and the sheet metal part edged in this manner, for example, taking into account materials characteristics and process characteristics, is uncoiled by means of a physical simulation, e.g., by means of an inverse one-step process. The operator parameters are essentially the pulled in edge of the sheet metal part in the target geometry as well as the materials characteristics and process characteristics.

The operator in the forming process corresponds to the first drawing operation. The required tools, as a rule the die, bottom die and sheet metal holder, and the other process parameters are automatically derived from the target geometry and if so required from preceding geometry stages.

Arranging billet on coil (cutting out billet):

The uncoiled billet is transformed into a standard billet capable of being cut with straight or bent cutters, e.g., by circumscription with a rectangle or trapeze with a minimum surface area, or else it is interleaved on the coil as forming billet. The starting geometry is the coil, respectively, the necessary coil width. The operator parameter is essentially the required billet type.

The operator in the forming process corresponds to the shearing-off, resp., the cutting out of the billet from the coil. The cutting line is automatically defined by the arrangement of the uncoiled billet on the coil.

Rotating (Swiveling):

The main working direction relative to the sheet metal part, or inversely the orientation of the geometry stage in the press, is capable of being changed from one process operation to the next one. This is represented by a rotation or turning of the geometry stage by means of a rotation operator.

The operator in the forming process corresponds to the swiveling (swinging) of the forming part prior to the insertion into the next press. This swiveling is automatically carried out in the simulation, which significantly simplifies the modeling of the insertion of the partially formed forming part into the tools of the following process operation and with this the setting-up of simulations of forming processes with several stages.

In case of the determination of tool parameters from corresponding geometries, one departs from the assumption, that the geometry is the shape of the sheet metal part, when the tools are completely closed. In doing so, it has to be taken into consideration, that in the real process the sheet metal parts are possibly smaller than the tools. Therefore in the case of the described procedure the geometry respectively is expanded by a fictitious proportion, in order that during the determination of the tool geometry it appears as a sheet metal part capable of being formed and with any expanse, this is also referred to as a "skin". The geometry thereupon is split-up into different areas, which in part overlap one another, and which then are assigned to the tools, such as, for example, sheet metal holder, die, slider, die bottom, and which define the geometry of the tools.

In the case of each one of the geometry operators, thereupon from the tool parameters the data for a simulation of the corresponding forming step are automatically produced.

In the following, the geometry operators illustrated in the FIGS. 1 and 2 are characterized in tabular form.

| Operator | Type | Corresponding forming step | Assigned process operation |
|---|---|---|---|
| e1, e2 | Filling holes | Perforating | PO3 |
| e3 | Filling hole | Perforating | PO4 |
| m1 | Over-pressing | Springing-back | |
| m2 | Unfolding | raising | PO5 |
| m3 | Adding folding flanges | Adjusting | PO6 |
| m4 | Generating pattern | Restriking | PO4 |
| m5 | Enlarging radii | Restriking | PO4 |
| m6 | Pre-forming | Restriking | PO3 |
| m7 | Cambering | Springing-back | |
| m8-e4 | Adding drawing geometry, uncoiling flanges | Cutting Folding | PO3 PO5 |
| e5 | Adding drawing geometry | Cutting | PO4 |
| m9 | Uncoiling drawing geometry | Drawing | PO2 |
| e6 | Arranging billet on coil | Cutting out billet | PO1 |

Once the geometry stages and the geometry operators have been defined, it is possible to automatically propagate local modifications thanks to the association and the parameterization of the geometry operators:

If, for example, in the geometry stage GS5 the form of the central bulge is manually modified, for example, because in the simulation during the forming process step corresponding to m5 a too strong thinning of the material has been identified, then the modifications through m7 are automatically propagated to GS6, copied on to GS7 and the parameters of the geometry operator m9 for the pre-forming and also of the corresponding tools are automatically updated.

If in GS1 the shape of the central bulge is modified, then it is automatically copied into GS2 to GS4 and the parameters of the geometry operator m5 for the restriking and of the corresponding tools are automatically updated.

If in GS1 the shape of the right-hand flange is modified, then through m2 in the unfolded form this is automatically updated and from it also the parameters of the geometry operator for the flange production m6 and of the corresponding tools are automatically updated.

The direction of propagation of modifications is therefore as a rule always in the direction of the less processed geometry stages. Modifications in a geometry or of an operator parameter are propagated recursively through the dependent geometry stages and as a result of this also to the dependent operators and tool parameters.

An algorithm for this automatic propagation is based on the circumstance, that the geometry operators, which associatively link geometry areas with one another, and furthermore the associative linking of the geometry operators with their dependent tool—and processing parameters form a directed graphical representation of the dependencies. If a change, respectively, a modification of a geometry or of a parameter takes place, the following examples of propagation rules are applied repetitively and recursively, until the modifications have been propagated through the graphic representation. This takes place for example, in a known manner by working through the rules in accordance with a width search through the graphic representation.

If an operator for a modified geometry area exists, the field of application of which in the target step of the operator overlaps with this modified geometry area, then this operator is applied and if so required the geometry of the starting stage is correspondingly modified.

If a modified geometry area is effective as a parameter for an operator, in the case of which the other parameters of this operator depend on this geometry area, then these other parameters of this operator are modified.

If a modified parameter is effective for an operator, in the case of which the geometry of the starting stage of the operator depends on this modified parameter, then this geometry of the starting stage is modified.

If the parameters of an operator have been modified, then the linked tool—and processing parameters dependent on it are updated.

In rare instances it is possible that the graphic representation comprises loops, for example, when the geometry of a stage influences an operator to a further processed stage. Thus, for example, when designing a second drawing stage, which is utilized in case of components with great drawing depths, it is frequently advantageous to produce the sheet metal holder surface of the second stage in the forming process on the basis of the sheet metal holder surface of the preceding first stage in the forming process. In cases of this kind, either the modifications are repetitively propagated through the loop until the variables concerned converge, or else the recalculation is stopped after a predefined number of passages through the loop.

In a preferred simple embodiment of the invention in a first step, departing from the first geometry stage, all operators applicable to this stage are carried out, and with this the next geometry stage and the corresponding tool parameters calculated. This step is repetitively applied to the next and to the following geometry stages.

Figure 3:
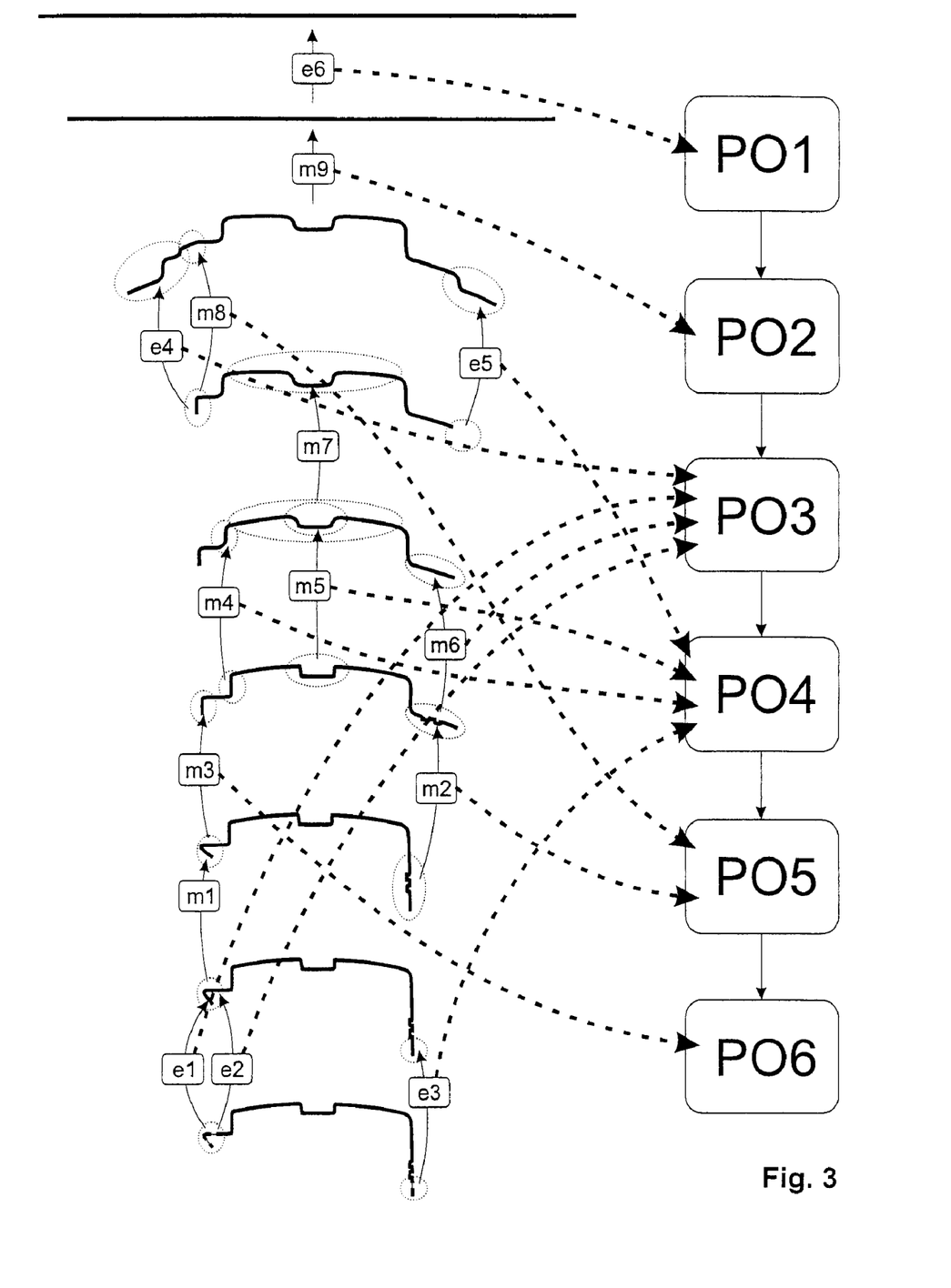
FIG. 3 an allocation of geometry operators to process operations.

FIG. 3 illustrates the allocation of the geometry operators m1-m9 and e1-e6 to the process operations PO1-PO6, in accordance with the above tabulation. According to this representation, respectively several geometry operators, which possibly are allocated to differing geometry stages GS1-GS9, are respectively allocated to a process operation PO1-PO6. For practical reasons, in doing so advantageously, geometry operators with respectively the same working direction relative to the sheet metal part are combined. Initially to every geometry operator m1-m9 and e1-e6 precisely one forming step is allocated. A forming step of this kind is, for example, implemented as a software object and comprises data for the description of the tools involved.

The directions of the arrows in case of the geometry operators as well as in the case of the allocations of geometry operators to process operations indicate the direction of influence in case of the propagation of modifications.

The production process or a simulation of it then takes place in reverse sequence corresponding to the process operations, in FIG. 3 this is represented by the arrows between the process operations PO1-PO6. Every process operation in reality corresponds to a set of tools, which are built into a press. The simulation of the production process is automatically derived in accordance with the geometry operators and their allocation to process operations PO1-PO6 from the geometry stages of the process layout (method plan).

Computer-wise it is possible that parts geometries are represented as geometry objects. In the expression geometry object, the word "object" is to be understood as a computer expression, therefore as a unity of data belonging together, which together describe an entity. A geometry object comprises a representation of a physical object or of a characteristic of a physical object, for example, of a line, of a surface or of a body. During the determination of a geometry object, essentially a geometrical model description of a physical object is calculated.

Computer-wise an operator is implemented through a data structure or through a software object in the meaning of the object-oriented programming, which for example, represents pointers to the associatively linked geometry objects, and characteristics of the one or more processing stages. A monitoring routine of the CAD system verifies, whether modifications have been made in a first geometry object or to parameters of the operator, and automatically triggers a recalculation in accordance with the operator process. By the recalculation, a further geometry object or an object for the description of tools is modified, and if so required an updating is propagated to further objects through further operators.

In the classical sequence of forming operations, forming process steps are carried out in presses, respectively, in transfer presses. Through a movement of the press in a main working direction, it is possible to carry out several individual forming steps in different areas of the sheet metal part in a single working cycle. For example, it is possible that in one area a folding operation, in second area the re-forming of an edge and in a third area a cutting operation are carried out on the same sheet metal part. For undercutting operations, in addition to the main working direction also sliders with other working directions are utilized as a part of a press, respectively, of a tool. The totality of all forming process steps carried out in a press is here described as a forming operation or as a process operation.

Between the presses the billets are transferred through transfer steps, wherein depending on the working direction of the press it is also possible, that a swiveling of the forming part is carried out.

As an alternative to the above arrangement of individual presses, in the method with progressive die presses a continuous billet is passed through several stations and in doing so is subjected to the process operations. The complete cutting free of the component in doing so as a rule only takes place in the last operation. In analogy to above, in one station a processing in one main working direction and if so required also in other working directions is carried out.

| LIST OF REFERENCE MARKS | |
|---|---|
| GS1 ... GS9 | Geometry stages |
| m1 ... m9 | Operators for the geometry modification |
| e1 ... e6 | Operators for the geometry expansion |
| PO1 ... PO6 | Process operations |
| 1 | Addendum (includes 20) |
| 2 | Sheet metal holder ring |
| 3 | Folding flange |
| 4 | Adjusting flange |
| 5 | Sheet metal holder surface |
| 6 | Edge |
| 7 | Die passage line |
| 8 | Original geometry stage (without flanges) |
| 9 | Edge of flange |
| 10 | Working direction |
| 11 | Folding jaw |
| 12 | Jaw height |
| 13 | Jaw radius |
| 14 | Jaw edge |
| 15 | Adjusting slider |
| 16 | Rounding surface |
| 17 | Slider working direction |
| 18 | Support |
| 19 | Holder |
| 20 | Uncoiled flange |
| 21 | Bending radius |
| 22 | Cylinder surface |
| 23 | Contact points, contact line |
| 24 | Edging line |
| 25 | Uncoiled edging line |
| 26 | Filling slider |
| 27 | Straight line |
| 28 | Support |
| 29 | Jaw bottom |

The invention claimed is:

1. A method for determining, by means of a computer-assisted design system, process operations for the description of sheet metal forming processes on a sheet metal forming part by a forming press, wherein a process operation corresponds to the operation of a forming press, the method comprising the following steps:

establishing a computer readable representation of a plurality of geometry stages, the geometry stages comprising a target geometry stage that defines the geometry of a finally formed part, and the geometry stages further comprising intermediate geometry stages;

defining geometry models comprising computerized descriptions of the geometry of the forming part in each of the geometry stages;

grouping, for each of the plurality of geometry stages, several geometry models of areas as the definition of the geometry stage, wherein the geometry stage describes at least a fictitious geometry of the forming part as a whole;

establishing a computer readable representation of several geometry operators, wherein each of the geometry operators associates a computerized description of the geometry of an area of a first one of the geometry models with a description of the geometry of an area of a second one of the geometry models, and the geometry operator describes a transition from one of the two associated geometries to the other one and the geometry operator thereby defines how to calculate the one of the two associated computerized descriptions from the other, given parameters of the geometry operator; and establishing a computer readable representation of several groups, each group comprising at least one geometry operator, wherein each of the groups respectively is associated with one of the process operations and comprises all geometry operators that are associated with this process operation, wherein each one of a sequence of process operations corresponds to operation of one of a sequence of forming presses or of a sequence of stations of a progressive die press, the operation of each of the forming presses or stations corresponding to a movement of this forming press or station in a main working direction in a single working cycle and comprising several individual forming steps carried out in different areas of the sheet metal part, and the group of operators associated with the process operation describes the individual forming steps carried out in this forming press or station; and wherein, for at least one of the groups:
two or more geometry operators are present in the group, and
each geometry operator associates a pair of geometry stages, each of these geometry stages describing at least a fictitious geometry of the forming part as a whole, and
a first geometry operator associates a first pair of geometry stages and a second geometry operator associates a second pair of geometry stages, and
the first pair of geometry stages and the second pair of geometry stages are different from each other.

2. The method in accordance with claim 1, further comprising the following step:
applying at least one of the geometry operators for the calculation of a first one of two associated geometries from the second one.

3. The method in accordance with claim 2, further comprising the following step:
determining parameters of at least one of the geometry operators from a geometry of the two geometries associated by the geometry operator.

4. The method in accordance with claim 1, further comprising the following step:
determining parameters of at least one of the geometry operators from a geometry of the two geometries associated by the geometry operator.

5. The method in accordance with claim 1, further comprising the following step:
In case of a change of a geometry of an area, automatically and recursively recalculating dependently associated geometries of areas, in accordance with the associating operator.

6. The method in accordance with claim 1, wherein geometry operators are linked together, in a manner such that an operator is applied to the result of another operator.

7. The method in accordance with claim 1, wherein the geometry operators comprise at least one of the following operator types: Filling holes, adding drawing geometry/uncoiling flanges, over-pressing, unfolding, pre-forming/generating patterns, casing, uncoiling drawing geometry, arranging billet on coil, and rotating.

8. The method in accordance with claim 1, wherein a definition of a geometry operator comprises a simulation of a forming process.

9. The method in accordance with claim 1, further comprising the following step:
structuring a description of forming processes on a computer-readable medium and/or for a user interface corresponding to the groups of respectively several geometry operators.

10. The method in accordance with claim 1, further comprising the following step:
automatically generating tool parameters and processing parameters for implementation of at least one of the geometry operators.

11. The method in accordance with claim 10, further comprising the following step:
In case of the modification of a geometry of an area, automatically recalculating dependently associated tool parameters and processing parameters.

12. The method in accordance with claim 1, further comprising the following step:
simulating process operations defined by tool parameters and processing parameters and calculating part geometries of parts formed according to these process operations.

13. The method in accordance with claim 1, wherein a geometry operator describes a transition from the first geometry model describing a target geometry of the forming part to the second geometry model describing a starting geometry of the forming part, and thereby defines how to calculate the starting geometry given the target geometry and parameters of the operator, and the geometry operator is associated with a forming process step that produces the target geometry out of the starting geometry.

14. The method in accordance with claim 13, further comprising the step of automatically propagating changes that are carried out in the target geometry to the starting geometry.

15. The method in accordance with claim 1, wherein the method determines process operations for the description of sheet metal forming processes on a sheet metal forming part by a sequence of forming presses, and wherein a process operation corresponds to the operation of one of the sequence of forming presses.

16. The method of claim 1, wherein at least one of the geometry stages describes a fictitious geometry of the forming part as a whole which is not produced by the process operations.

17. A data processing system for the determination of process operations for the description of forming processes on a forming part, wherein the data processing system is programmed to execute the method in accordance with claim 1.

* * * * *